(12) United States Patent
Bodmer et al.

(10) Patent No.: US 6,783,346 B2
(45) Date of Patent: Aug. 31, 2004

(54) DEVICE FOR MANUFACTURING ARTICLES MADE OF PLASTIC

(75) Inventors: Werner Bodmer, Haslach (DE); Rainer Armbruster, Wolfach (DE)

(73) Assignee: Foboha GmbH, Haslach (DE)

( * ) Notice: Subject to any disclaimer, the term of this patent is extended or adjusted under 35 U.S.C. 154(b) by 88 days.

(21) Appl. No.: 10/058,507

(22) Filed: Jan. 28, 2002

(65) Prior Publication Data

US 2002/0101005 A1 Aug. 1, 2002

(30) Foreign Application Priority Data

Jan. 29, 2001 (EP) ............................................. 01101981

(51) Int. Cl.⁷ .............................................. B29C 45/16
(52) U.S. Cl. ...................... 425/112; 264/255; 425/123; 425/127; 425/129.1; 425/576
(58) Field of Search ................. 425/112, 121, 425/123, 126.1, 127, 129.1, 576, 130

(56) References Cited

U.S. PATENT DOCUMENTS

| | | | |
|---|---|---|---|
| 4,744,741 A | * 5/1988 | Glover et al. | 425/123 |
| 5,256,048 A | * 10/1993 | Jacobs et al. | 264/255 |
| 5,609,890 A | * 3/1997 | Boucherie | 425/123 |
| 5,773,049 A | * 6/1998 | Kashiwa et al. | 264/255 |
| 6,139,305 A | * 10/2000 | Nesch | 425/576 |
| 6,210,619 B1 | * 4/2001 | Owens | 264/255 |
| 6,379,139 B1 | * 4/2002 | Boucherie | 425/129.1 |
| 6,447,280 B1 | * 9/2002 | Grimm | 425/127 |
| 6,679,696 B1 | * 1/2004 | McConnell et al. | 425/112 |

FOREIGN PATENT DOCUMENTS

| | | |
|---|---|---|
| DE | 195 42 102 A1 | 5/1997 |
| EP | 0 922 556 A1 | 6/1999 |
| EP | 0 742 090 B1 | 1/2002 |
| JP | 5-245870 | 9/1993 |

OTHER PUBLICATIONS

WO 99/28108, "Injection Molding Machine with Displaceable Molds, a Holding Device and a Die Holder for Such and Injection Molding Machine", Foboha GmbH, Publication Date: Jun. 10, 1999.

Jaroschek C et al: "Der Horizontale Dreh" Kunststoffe, De, Carl Hanser Verlag. Munchen, Bd. 88, Nr. 9, Sep. 1, 1998, Seite 1412, 1414, 1416 XP000790487.

* cited by examiner

Primary Examiner—Tim Heitbrink
(74) Attorney, Agent, or Firm—Rankin, Hill, Porter & Clark LLP

(57) ABSTRACT

A device (1) and method for injection molding articles (25) with several plastic material components. The device (1) includes a fixed, first half mold (3), a second half-mold (6) that is movable relative to the first half-mold (3) for the purpose of opening and closing the device (1). The device also includes at least two further half-molds (10, 11), which are jointly movable relative to the first and second half-molds (3, 6), and which, in the closed position of the device (1), are situated between the first and the second half-molds (3, 6) such that cavities are formed in each of a first and a second parting plane (32, 33). The two further half-molds (10, 11), which are jointly movable, include a device (22), which in the case of an opened device (1) serves to transport the article (25) out of a first cavity (21.1) into a second cavity (21.2) so that the article (25) can be injection molded around with a further material component in the second cavity (21.2).

9 Claims, 3 Drawing Sheets

DEVICE FOR MANUFACTURING ARTICLES MADE OF PLASTIC

BACKGROUND OF THE INVENTION

1. Field of the Invention

The present invention is generally related to a device and a method for manufacturing articles made of plastic material and, more particularly, toward a device and method for manufacturing brushes and, more particularly, toothbrushes.

2. Description of Related Art

Articles made of plastic material, in particular toothbrushes, are frequently manufactured out of differing materials and are multicolored. In the case of toothbrushes, for example, soft materials are combined with hard materials, wherein the soft materials, for example, form gripping surfaces or flexing points. Toothbrushes of this type, which consist of several material components or which have several colors, are manufactured in special tools.

Known from prior art are various devices and methods for the manufacture of toothbrushes out of several material components. EP 0 0742 090, for example, demonstrates a device, which is based on a rotary table (star wheel tool). In this, individual material components are injected from one side into multi-part cavities, which in certain areas are actively connected with the rotary table situated in a single plane. The articles to be injection molded around are moved by the rotary table from one cavity to the next lying in the plane, wherein they are held in a zone, which only comprises a single material component. All cavities have the same parting plane.

This device has the disadvantage that, because of the cavities located adjacent to one another, it has to be built with very large dimensions and, for this reason, within a single cycle only a few articles can be manufactured. An integration of a device in accordance with this principle into a standard injection molding machine, wherein the half-molds are guided along spars, is uneconomical because the distances between the spars of the injection molding machine are standardised and as a result of this the maximum dimensions are limited.

SUMMARY OF THE INVENTION

It is an objective of the invention to provide a device and a method that makes possible an optimised manufacture of articles made of plastic material with several material components and colors.

The invention is explained in more detail on the basis of a toothbrush. For the specialist it is clear, however, that the invention is not restricted to the manufacture of articles of this type.

Brush bodies of toothbrushes as a rule consist of a handle, which serves to grip the brush, a head, on which the bristles of the brush are affixed and a stem, which connects the handle with the head.

Toothbrushes as well as other articles made of plastic, which consist of several components or colors, today are manufactured by injection molding. In doing so, the individual colors and material components are injected into cavities one after the other, in which in part intermediate products to be injection molded around have been placed. The articles are moved from one cavity to the next by means of mechanical aids, in that they are held in a zone suitable for this, which only comprises a single material component. A brush body of a toothbrush, for example, is preferably held in the zone of the head of the brush while it is moved from one cavity to the next, because this zone as a rule is not equipped with several materials. Through the choice of the materials and in particular of their melting points, it is guaranteed that a component is not damaged, by melting in an uncontrolled manner, while being injected around with a further component.

The half-molds of an injection mold for manufacturing injection molded components are usually attached to mounting plates in an injection molding machine. A first half-mold is fastened to a fixed mounting plate and a second half-mold is fastened to a movable mounting plate, which in most instances is guided by four spars. Because the two half-molds are arranged between the spars of the Injection molding machine, their maximum expanse is restricted by the distance between the spars. Today's molds for the manufacture of articles made of plastic with several material components are based on star wheel tools with rotary tables on which the part products are moved out of one cavity into another one. In doing so, the cavities are arranged adjacent to one another in a circle on a plane. In order to get from one cavity to the next one, the articles or the cavities are moved around the axis of the rotary table, which is arranged parallel to the spars of the injection molding machine. A significant disadvantage of this arrangement is that the number of articles is massively limited because of the tight space conditions.

The invention divulged here demonstrates a device and a method, which significantly improves the manufacturing operation for articles made of plastic with several material and/or color components. In contrast to methods known from prior art, the individual material or color components are not manufactured in one plane on a rotary plate (star wheel tool), but rather manufactured in a tool with several levels (parting planes). This is a further development of an injection molding technology of the same applicant, which in part is already known from WO 99/28108.

The invention divulged here described in a simplified manner is based on the fact that, between a geographically fixed first and a movable second half-mold, each of which comprises at least one half-cavity, a third mold carrier is arranged as rotatable around an axis and displaceable at an angle to this axis. The third mold carrier serves to accommodate at least one third and one fourth half-mold with at least two half-cavities, which half-cavities of the third and fourth half-mold are actively connectable alternatingly with the first or second half-mold. These further half-molds comprise means to put in place articles (intermediate products) in the area of the further half-molds from one half-cavity to the other so that they can be injection molded around with another material component in the other cavity on several sides. These means preferably are slides, which are at least partially integrated into a cavity.

The rotational axis of the third mold carrier preferably is arranged substantially vertically to the direction of movement of the movable second mold carrier and additionally translatorily displaceable in the same direction as the moveable second half-mold. The third and the fourth half-molds are affixed to two opposite sides of the third mold carrier and, in the closed condition of the complete mold, alternatingly act in conjunction with the first or with the second half-mold in two parting planes so that on every side of the movable mold carrier at least one cavity is formed by the half-cavities of the half-molds. By means of this injection molding of material components in several planes it is achieved that, in contrast to the star wheel tools known from prior art, more articles injection molded around on several sides are capable of being manufactured with one tool. The closing forces necessary for sealing the mold, as a result of the several comparatively smaller separating planes, are correspondingly smaller.

The movements of the second half-mold as well as of the third and fourth half-molds attached to the rotatable mold carrier are preferably coordinated with one another. The coordination can be designed as follows. When opening the mold the second half-mold is displaced translatorily relative to the first half-mold. Simultaneously, the mold carrier arranged to be movable with the third and the fourth half-mold, which in the closed condition are arranged between the first and the second half-molds, is moved translatorily with about half the speed of the second half-mold in the same direction as the second half-mold, so that the two separating planes are opened symmetrically. The movement is carried out to such an extent that the movably arranged mold carrier with the third and the fourth half-molds is capable of being rotated around its axis, so that the articles from a first material component are capable of being moved out of one cavity In the area of the first parting plane on the side of the fixed first half-mold into a cavity in the area of the second parting plane on the side of the movable second half-mold.

In the case of brush bodies, for example, which around their handles (e.g., at the top and at the bottom) comprise several material components or colors, it is necessary, that the cavities have different shapes for the differing material components. For this reason, a change of cavity is necessary for the second material component. The articles for this purpose are held gripped in a zone into which no second component is injection molded on and, in this manner, out of the first cavity are placed into a second one. Toothbrushes preferably are held gripped In the zone of the brush head at the apertures for the bristles. The holder for transferring the articles from one cavity into a further one preferably is integrated into the half-molds, which are moved along with the third mold carrier, which forms a part of the cavities themselves.

The movably arranged middle mold carrier, if so required, can comprise more than two opposite areas, which are suitable for receiving half-molds. As a result, it is possible, for example, that articles during the displacement from a first to a second injection molding position are subjected to a cooling phase, finished parts removed or further components injection molded.

The movable mold carrier is in preference guided by at least one cross-head, which is, e.g., displaceably mounted on the spars of the Injection molding machine. Particularly advantageous is an arrangement with two cross-heads, which guide the mold carrier on two sides and which are capable of being moved independently of one another, so that the mold carrier and the half-molds assigned to it can be installed and removed in a particularly simple manner.

The rotary bearing of the rotatable mold carrier is designed such that the media and information, such as cooling liquids, hydraulic oil, electric power and data are coaxially transferred, resp., exchanged in the zone of the rotary bearing. The bearings preferably are designed such that no limitation in any direction of rotation is present.

The mold, the half-molds and/or the mold carriers, preferably comprise means for measuring the condition of the process and/or means for storing in memory the condition of the process. These means can be utilised for the purpose of, for example, adjusting the optimum parameters in the case of a tool change. The half-molds preferably are connected with the injection molding machines through standard interfaces, so that a maximum interchangeability is guaranteed. By means of a standardisation of interfaces for the transfer of media, such as cooling liquids (water, gas, oil), hydraulic, electrical, and mechanical energy as well as information and signals, it is possible to match molds and injection molding machines with one another such that a change in the course of a manufacturing process is capable of being carried out in a very short time. The interfaces are defined such that they are capable of being suitably combined for several molds.

The devices for the injection molding of articles made of plastic divulged here preferably comprise means for the storage in memory of information, such as microprocessors, data storage units, etc. They are advantageously integrated into a half-mold and they contain relevant data concerning the mold, a manufacturing process, the materials utilised, etc. These means for the storage in memory are connected with the injection molding machine through defined interfaces and if so required also with further devices. The interfaces are conceived such that they are able to be utilised in a variety of ways. It is therefore possible, for example, to design several molds for an existing machine with a defined interface.

The molds comprise accordingly corresponding interfaces. The molds comprise means for the storage in memory of information. In these, during the manufacturing process all relevant data are stored in memory. These are either determined in advance by calculation or by means of tests or else are established during the production process. In doing so, these data are not fixed, but rather are changeable as and when required such that, for example, certain values obtained from experience are capable of being taken into consideration. If, during the production a change of the manufacturing process is necessary, then the relevant data are updated when required, active interfaces are released from the mold and the injection molding machine, the mold is removed from the injection molding, machine and replaced by another one, which also comprises a corresponding a interface, which can be actively connected. The interfaces for the transferring of media advantageously comprise self-sealing couplings. These are constructed in such a manner, that the interfaces can be connected and disconnected without any significant loss of media. When inserting a mold into an injection molding machine, the interfaces of the mold and of the machine are actively connected. From the means for the storage in memory of data, for example, all relevant data are transferred to the injection molding machine in such a manner, that it optimally adapts itself to the mold. In doing so, volume flows of the cooling medium, the temperature of the heating elements, the closing pressure of the machine, cycle times, injection parameters, etc., are transferred. The means for the storage in memory of data if so required or also alternatively may consist of a microprocessor, which monitors the values of sensors or operates the regulated values. The relevant data advantageously are transmitted as digital signals. A corresponding device can also be utilised for safeguarding the production process, inasmuch as, for example, safety functions are monitored and executed. It is possible, e.g., to monitor service values, which define when a mold has to be serviced (for example, the number of cycles, etc.). In a machine it is possible to utilise more than one interface.

For example, for assembly injection molding, both the fixed first half-mold as well as the movable second half-mold can comprise means for a change of cavities. As a result it is possible to introduce additional material components.

The method divulged here for the injection molding of an article made up of several plastic components can in a simplified manner be described as follows. In a first step, in a working position of the injection molding machine a first liquid/plastic material is injected into a cavity in the zone of a first parting plane of the injection molding machine for the purpose of molding an article. In a second step, the article made out of the first plastic material after solidifying or in a partially plastic condition after opening the injection molding device is brought from the first cavity in the zone of the first parting plane into a second cavity in the zone of a second parting plane, which is located at a distance from the first parting plane, where in a third step in the working position of the injection molding machine it is injection molded around with a further plastic material component. It is advantageous that, while in the second cavity the article is being injection molded around with the further plastic material component, simultaneously in the first cavity a further article is being injection molded.

BRIEF DESCRIPTION OF THE DRAWINGS

These and further features of the invention will be apparent with reference to the following description and drawings, wherein schematically and in a strongly simplified manner.

DETAILED DESCRIPTION OF THE PREFERRED EMBODIMENTS

Figure 1:
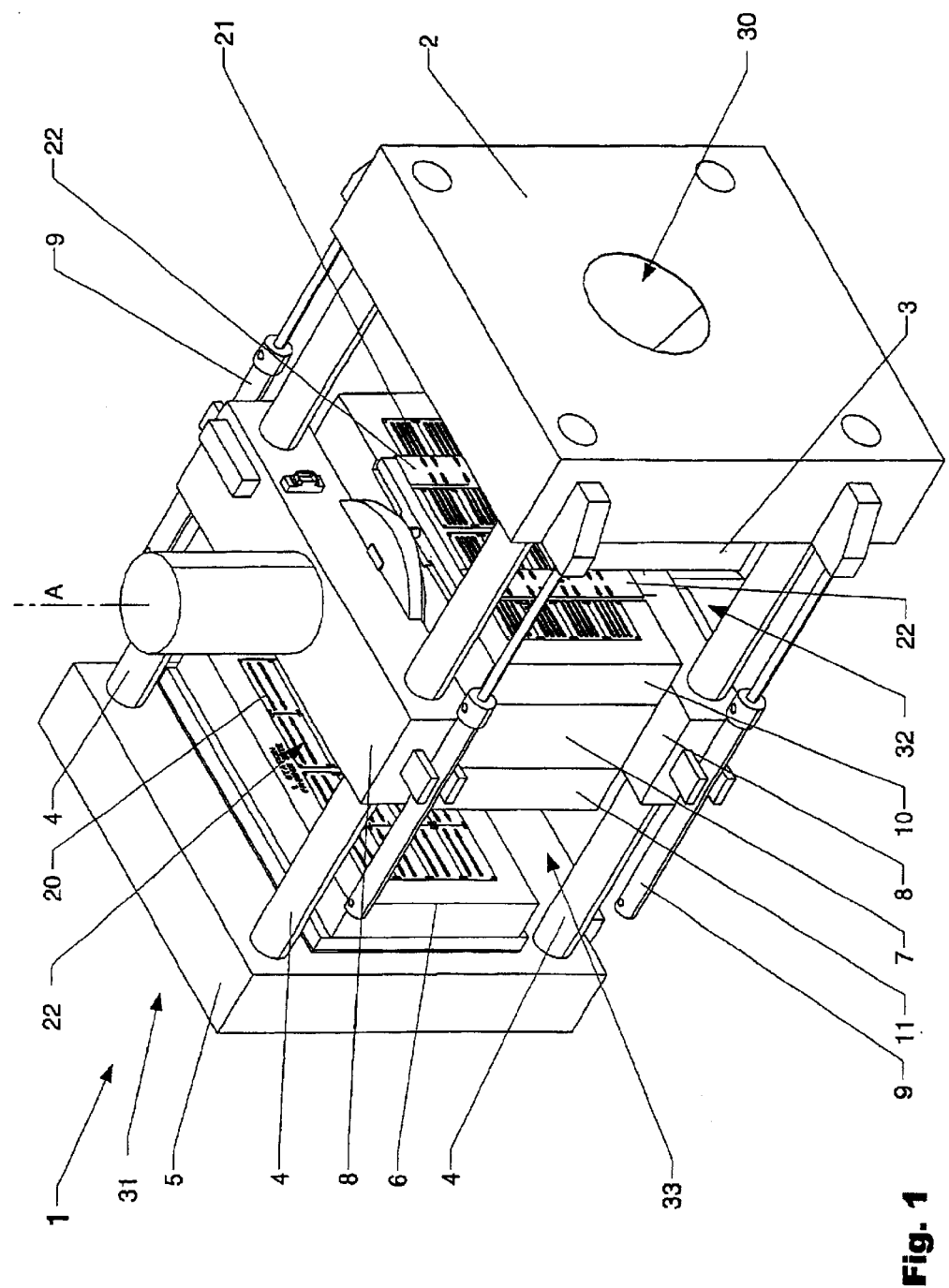
FIG. 1 illustrates a device for the manufacture of toothbrushes.

FIG. 1 schematically and in a strongly simplified manner and in a perspective view illustrates a preferred embodiment of an injection molding mold 1 according to the invention for the manufacture of toothbrushes. A first, fixed mold carrier 2 serves as the base for a first, fixed half-mold 3. Four spars 4 connected with this first mold carrier 2 serve for bearing a second mold carrier 5, which is displaceably arranged along the spars 4. The second mold carrier 5 serves as base for a second half-mold 6, which is displaceably arranged.

Visible between the first and the second mold carriers 2, 5 is a third mold carrier 7, which here is supported between two cross-heads 8 and is rotatable around an axis A and displaceably arranged with the cross-heads 8. The third mold carrier 7 serves as a base for a third and fourth half-molds 10, 11. The axis A is substantially vertical and transverse to the spars 4. The cross-heads 8 are arranged to be displaceable along the spars 4 independently of one another, so that the third one of the mold carriers 7 is particularly easily removable and installable from above between the spars. The cross-heads 8 are displaceable along the spars 4 by means of actuating means, here in the form of hydraulic cylinders 9.

The device 1 is illustrated in an opened position, so that the cavities 20 of the movable, second half-mold 6 and the cavities 21 of the third half-mold 10 are visible. The third and the fourth half-molds 10, 11 comprise slides 22, which serve for moving articles made of a first material component out of a first cavity into a further one (in this context, refer to the description for FIG. 3), so that the articles can be injection molded around on several sides. The movement of the slides is designed such that the articles are moved out of the first cavity, displaced and placed inside a second cavity, so that they can be injection molded around with a further material component.

The injection mold 1 is utilised in conjunction with an injection molding machine (not illustrated here in detail). The injection molding machine comprises means for pressing the half-molds 3, 6, 10, 11 against one another during the injection molding process, so that hollow spaces are formed by the cavities 20, 21. The spars 4 may be spars of the injection molding machine or else separate guiding means.

The molten plastic mass is injected into the cavities 20, 21 formed by the half-molds 3, 6, 10, 11 through apertures 30, 31 situated opposite the half-molds In the mold carriers 2, 5 In the closed condition (working position) of the injection molding mold 1. The apertures 30, 31 verge into channels with branch-offs, which extend through the first and the second mold carrier 2, 5 right into the cavities 20, 21. The device for introducing the molten plastic mass through the apertures 30, 31 in the second mold carrier 5 is arranged to be movable, so that the device 1 is capable of being opened and closed. As can be identified, in contrast to the devices known from prior art, articles of differing shape are simultaneously injection molded in several parting planes 32, 33, which are located at a distance from one another.

Figure 2:
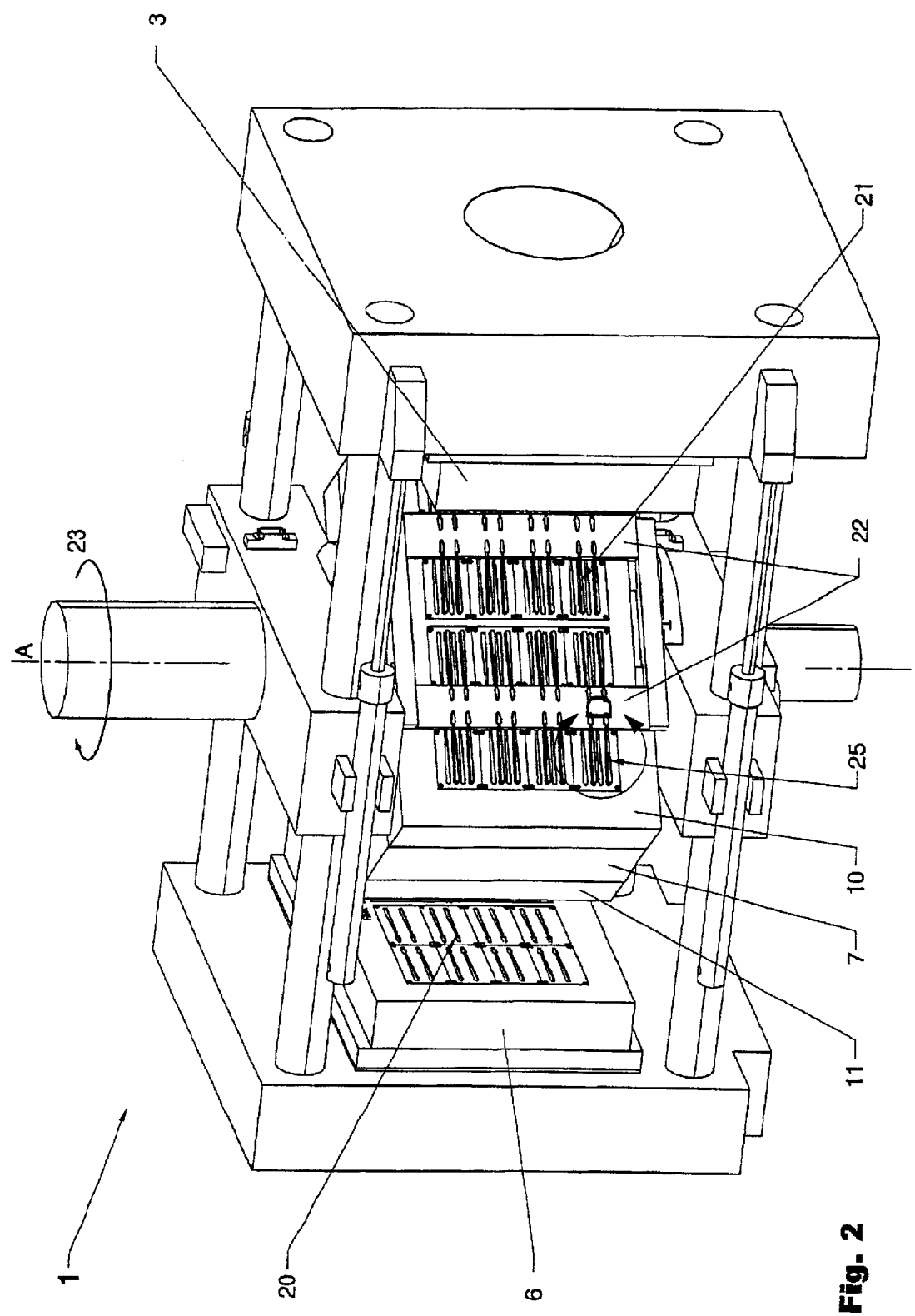
FIG. 2 illustrates the device in accordance with FIG. 1 in a further representation.

FIG. 2 schematically and in a strongly simplified manner depicts a "snap-shot" of the injection molding mold in accordance with FIG. 1 while the third mold carrier 7, including the third and fourth half-molds 10, 11 with the injection molding mold 1 opened, rotated in the direction of arrow 23 by 180° around the axis A. As can be identified, the third half-mold 10 (and in an analogous manner the fourth half-mold 11) comprise slides 22, which serve for the displacement of articles 25 out of one cavity into another cavity 21.1, 21.2 (refer to FIG. 3), while the third and the fourth half-molds 10, 11 are moved around the axis A. In the further cavity 21.1, the articles after the closing of the injection molding mold 1 are injection molded around with a further material component.

The half-molds 3, 6, 10, 11 each comprise four rows of cavities 20, 21, wherein the cavities 21.1, 21.2 of the third and of the fourth half-molds 10, 11 are each implemented as double. This is necessary, in order to be in a position to injection mold around the articles 25 with a further material component by displacement from two sides.

Figure 3:
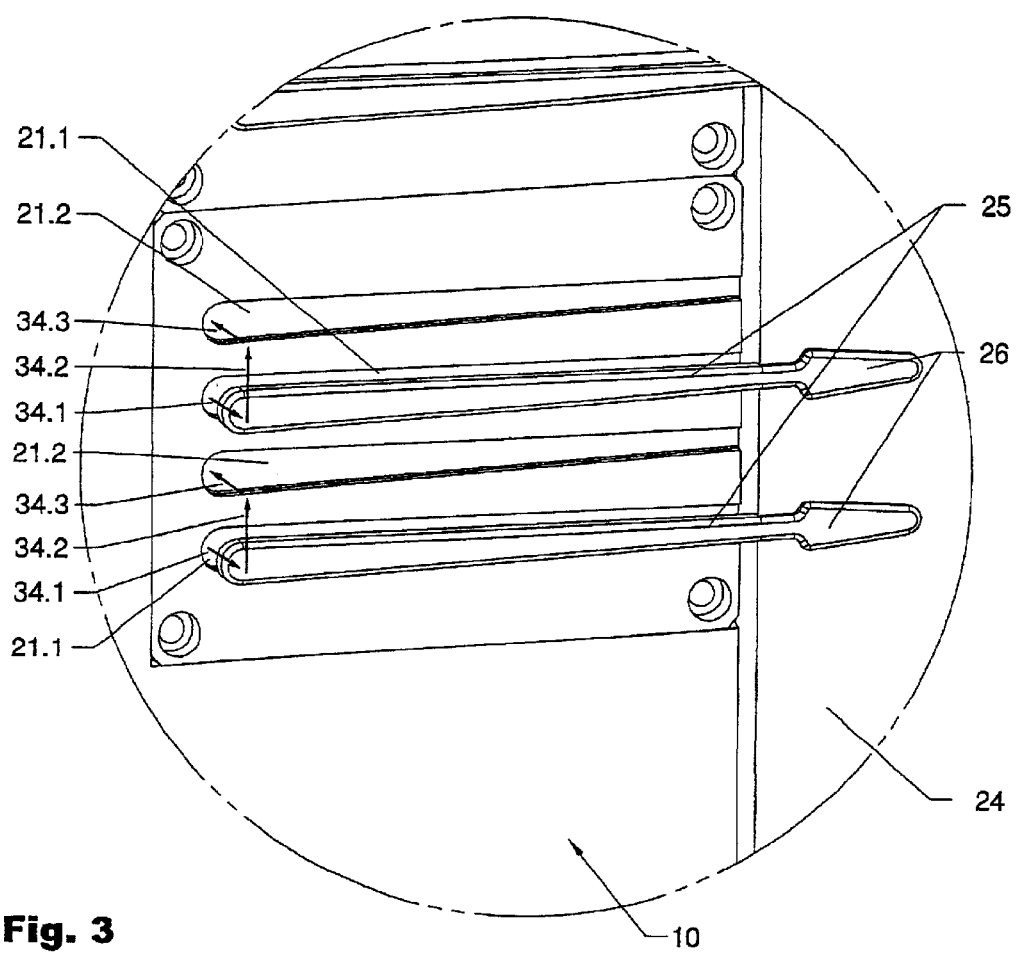
FIG. 3 illustrates a portion of FIG. 2.

FIG. 3 illustrates an excerpt D from FIG. 2. In this Figure, by means of arrows 34.1, 34.2, 34.3 it is schematically illustrated, how the articles 25 by means of the slide 22 are transferred out of a first to a second half-cavity 21.1, 21.2. The articles 25 are brush bodies of toothbrushes. The brush bodies 25 are held gripped in the zone of their head 26 by the slide 22, while their handles 27 are transferred to a further cavity.

What is claimed is:

1. A device (1) for the injection molding of a multi-component-article (25) said multi-component-article comprising plural plastic material components, said device comprising a fixed, first half-mold (3) and a movable, second half-mold (6), said second half-mold being movable relative to the first half-mold to permit opening and closing of the device (1), said device further comprising at least two further half-molds (10, 11) arranged to be jointly movable relative to the first and the second half-molds (3, 6), the further half-molds (10, 11), when the device (1) is closed, mold are arranged between the first and second half-molds (3, 6) such that cavities are formed in each of a first and a second parting plane (32, 33), wherein each further half-mold comprises first and second cavities, said first and second cavities mating with cavities of the first and second mold halves forming said mold cavities, each further half-mold further comprising means to transport a first formed article out of its respective first cavity and into its respective second cavity such that the first formed article is capable of being injection molded with a further material component to form said multi-component article.

2. The device (1) according to claim 1, wherein the means (22) is a slide (22).

3. The device (1) according to claim 1, wherein the means (22) defines a portion of each of the first and second cavities (20, 21).

4. The device (1) according to claim 1, father comprising a mold carrier (7), said mold carrier being rotatable about an axis (A) and displaceable at an angle relative to said axis, wherein said mold carrier serves to receive and to move jointly with the two further half-molds (10, 11) such that the two further half-molds (10, 11), are capable of being brought into a working position alternatingly with the first or with the second half-molds (3, 6).

5. The device (1) according to claim 4, wherein the mold carrier (7) is displaceable by 180° about said axis (A).

6. The device (1) in accordance with claim 5, wherein the mold carrier (7) is supported by the two cross-heads, such that the mold carrier (7), when the device (1) opened, is capable of being rotated around the axis (A) and jointly movable with the cross-heads (8).

7. The device (1) according to claim 6, wherein the cross-heads (8) are guided on spars (4).

8. The device (1) according to 7, wherein the cross-heads (8), are displaceable independently of one another.

9. The device (1) according to claim 7, wherein the spars (4) guide the second, movable half-mold (6).

* * * * *

UNITED STATES PATENT AND TRADEMARK OFFICE
CERTIFICATE OF CORRECTION

PATENT NO. : 6,783,346 B2  
DATED : August 31, 2004  
INVENTOR(S) : Werner Bodmer et al.

It is certified that error appears in the above-identified patent and that said Letters Patent is hereby corrected as shown below:

Column 6,  
Line 66, after "that" insert -- mold --.

Signed and Sealed this

Twenty-ninth Day of March, 2005

JON W. DUDAS  
*Director of the United States Patent and Trademark Office*